July 31, 1956     F. H. FRISBIE ET AL     2,756,661
SOD CUTTER AND WINDER
Filed March 29, 1954     2 Sheets-Sheet 1
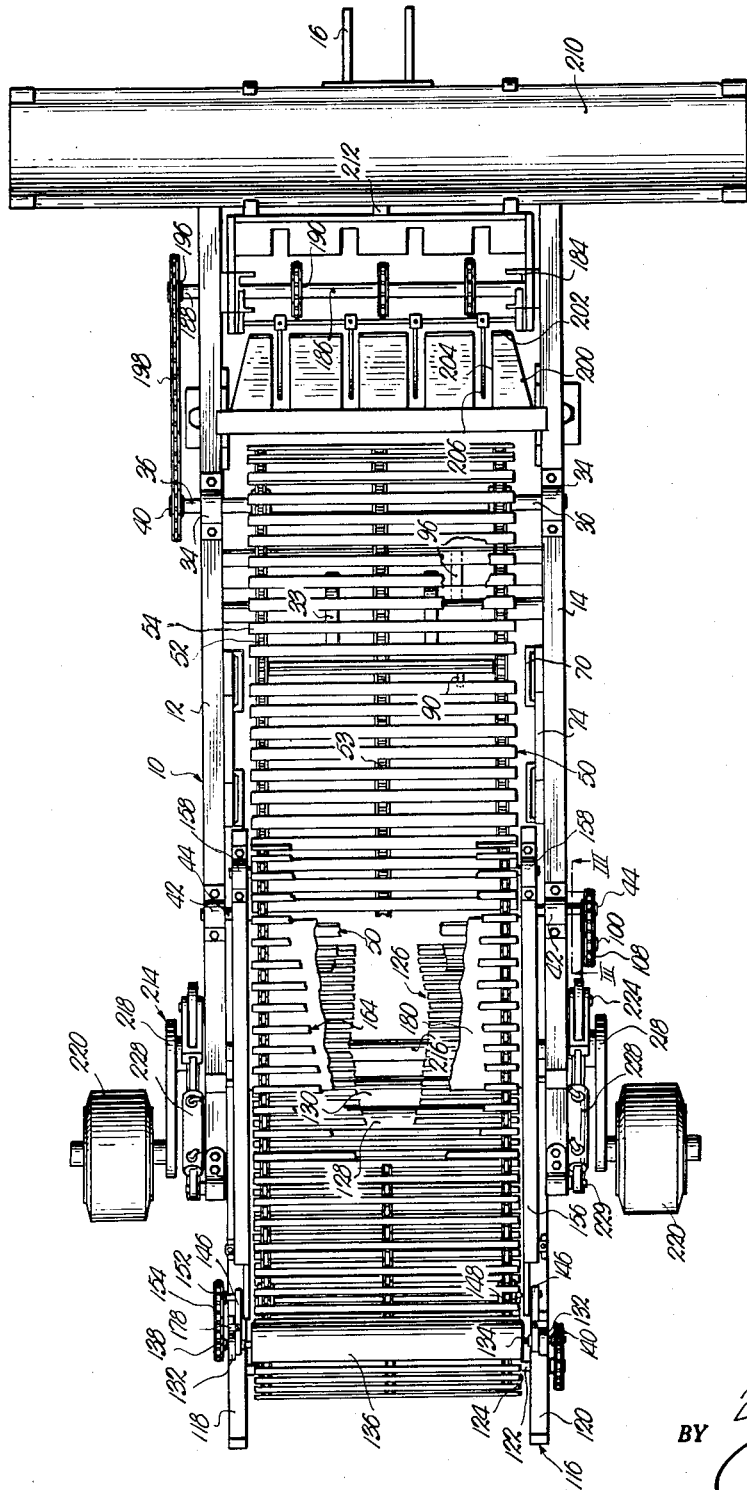
Fig. 1.
INVENTORS.
Francis H. Frisbie
Delbert R. Frisbie
BY
ATTORNEY.

July 31, 1956  F. H. FRISBIE ET AL  2,756,661
SOD CUTTER AND WINDER
Filed March 29, 1954  2 Sheets—Sheet 2
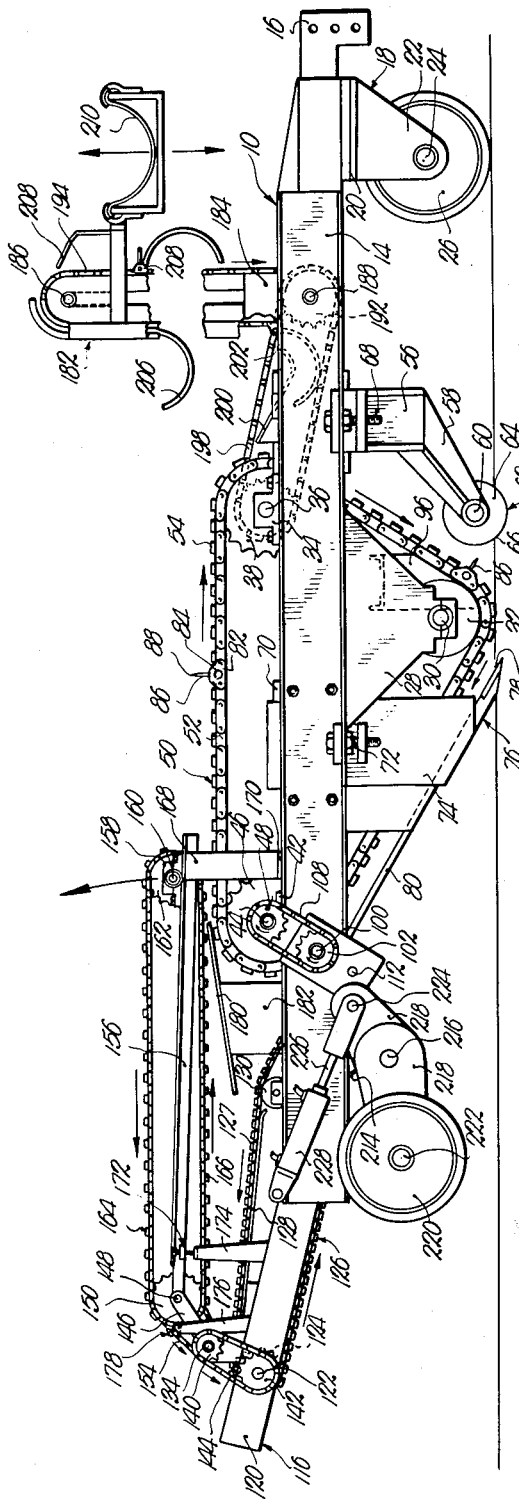
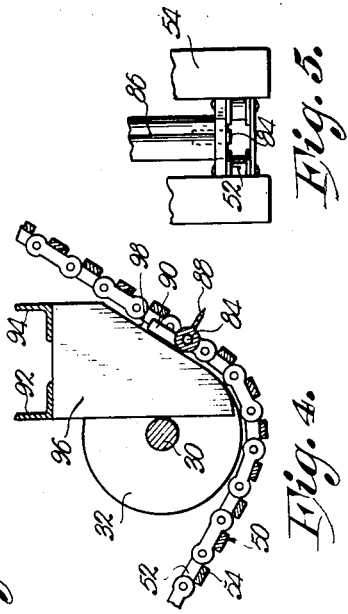
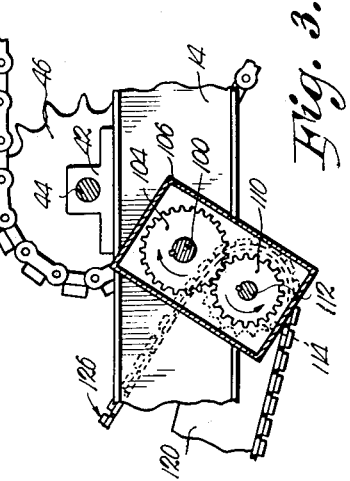
INVENTORS.
Francis H. Frisbie
Delbert R. Frisbie
BY
ATTORNEY.

United States Patent Office 2,756,661
Patented July 31, 1956

2,756,661

SOD CUTTER AND WINDER

Francis H. Frisbie and Delbert R. Frisbie, Kansas City, Mo.

Application March 29, 1954, Serial No. 419,504

11 Claims. (Cl. 97—226)

This invention relates to sod stripping apparatus and, more particularly, to an improved machine for cutting sod from the ground into predetermined lengths, widths and thicknesses, for elevating the sod after it is cut and stripped from the ground into the machine, for rolling the sod into a tightly compacted roll, and for conveying and elevating the rolls of sod to a position for discharge from the machine onto a truck or the like.

The principal object of this invention is to provide an improved machine of the kind described adapted for reducing the work required to produce rolled sod and to increase the quantities of rolled sod that may be produced during a given period.

Another important object of this invention is to provide a sod cutting and rolling machine which derives the operating power required for its various moving parts from mechanism which is operated as the machine is moved along the ground.

Another important object of this invention is to provide improved structure for cutting the sod into pieces of predetermined dimensions and for elevating the stripped sod into the machine carrying the sod rolling apparatus.

Another important object of this invention is to provide improved structure for rolling strips into rolls of increased compactness.

Other important objects of this invention, including the manner in which the subject machine tends to shake excess soil from a strip of sod so as to expose the ends of the roots for easily taking root when the roll is transplanted, the way in which various structural components of the machine perform multiple functions to render the overall assembly as simple as possible, and certain important details of construction, will be made clear or become apparent as the following description of the invention progresses. In the accompanying drawings:

Figure 1 is a top plan view of the sod cutter and winder machine of this invention, with certain parts thereof being broken away for clarity of illustration;

Fig. 2 is a side elevational view of such a sod cutter and winder machine;

Fig. 3 is a fragmentary, enlarged cross sectional view taken on line III—III of Fig. 1;

Fig. 4 is a fragmentary, enlarged cross sectional view of the support roller, traction chain, cut-off blade and cut-off cam assemblies utilized in the invention; and Fig. 5 is a fragmentary, enlarged top plan view illustrating the manner in which the cut-off blade is pivotally mounted upon the traction chain.

Referring now particularly to Figs. 1 and 2, the numeral 10 generally designates a main frame assembly having a pair of elongated, spaced apart side beams 12 and 14 suitably joined by cross members not specifically numbered, for presenting a rigid, rectangular frame 10. Adjacent the normally front end of frame 10 is provided a suitable draw-bar assembly 16 by which frame 10 may be coupled to a tractor, truck or other prime mover by which the machine of this invention will be drawn along the ground. Obviously, prime moving means could be incorporated as a part of the machine of this invention, if desired, in order to render the same self-propelled.

Depending from frame 10 adjacent the front end thereof is a front wheel assembly broadly designated 18 and preferably including a swivel plate 20 pivotally connected with frame 10, a bearing bracket 22 depending from plate 20, a shaft 24 journalled in bracket 22 and a single wheel 26 rotatably mounted upon shaft 24. Since front wheel assembly 18 is pivotally mounted upon frame 10 it is clear that wheel 26 is, in essence, a caster wheel which will freely turn in any direction to follow the direction of motion of the machine as it is pulled by a tractor or the like coupled with draw-bar 16.

Depending from each of side beams 12 and 14 of frame 10 respectively is a mounting bracket 28 in which is journalled an elongated shaft 30 extending transversely of frame 10 below beams 12 and 14 thereof. Rotatably mounted upon shaft 30 is a support roller 32, which may comprise either a single roller extending substantially between brackets 28 or a number of wheels or rollers 33 spaced along the length of shaft 30, as illustrated in Fig. 1.

A journal block 34 is mounted atop each of beams 12 and 14 respectively, preferably forwardly of shaft 30, and a shaft 36 is journalled in blocks 34 and carries a pair of spaced sprockets 38 which are rigidly mounted upon shaft 36. Shaft 36 extends laterally beyond one journal block 34, as illustrated in Fig. 1, and has rigidly mounted on such extended portion a driving sprocket 40.

A second pair of journal blocks 42 is mounted atop beams 12 and 14 respectively rearwardly of shaft 30. A shaft 44 is rotatably journalled in blocks 42 and rigidly carries a spaced pair of sprockets 46 between blocks 42 and a driving sprocket 48 on a portion of shaft 44 extending beyond one journal block 42, as illustrated in Fig. 1.

Extending around and trained over roller 32, sprockets 38 and sprockets 46 is an endless traction chain assembly generally designated by the numeral 50 which includes a pair of spaced chains 52 received by the corresponding ones of pairs of sprockets 38 and 46 and also passing under and around roller 32, and a number of cross pieces 54 which extend between and interconnect chains 52. It may be noted that, as illustrated in Fig. 1, one or more additional chains 53 may be provided depending upon the width of chain assembly 50, it being understood that extra sprockets 38 and 46 will be provided for each chain 52 and 53 that may be used. Cross pieces 54 are preferably metallic strips, rigidly mounted in any suitable fashion upon chains 52, and 53 if the latter are provided, and as is clear in the drawings, are spaced in parallelism along the lengths of chains 52 and 53.

As will be clear from Fig. 2, traction chain assembly 50 engages the ground between the latter and roller 32 and in conjunction with roller 32, shaft 30 and mounting brackets 28 bear the principal weight of the machine as it moves along the ground, front wheel assembly 18 serving mainly as a guide and balancing structure. It may be noted that, if roller 32 is disposed at the point of balance of the machine and draw-bar assembly 16 is suitably coupled with a tractor or the like, the front wheel assembly 18 could be omitted. However, the strain upon draw-bar assembly 16 and the tractor will be lessened by the preferable construction wherein roller 32 is disposed slightly to the rear of the point of balance of the machine so that front wheel assembly 18 may aid in supporting and balancing the machine and in facilitating the manuevering of same during turns.

Depending from beams 12 and 14 of frame 10 forwardly of brackets 28 are a pair of extension pieces 56 including rearwardly angled portions 58 in which are journalled a shaft 60 carrying a rotatable roller generally indicated by the numeral 62 and conventionally including a pair of end discs 64 of greater diameter than the intermediate portion of roller 62, discs 64 being provided with cutting edges 66 which make a pair of spaced, parallel cuts in the ground as the machine advances to define the width of a strip of sod to be cut and lifted from the ground. It will be understood that the intermediate portion of roller 62 between cutting discs 64 serves to roll the ground from which the strip is being cut by edges 66 of discs 64, in order to remove minor irregularities from the contour of the upper side of the strip. Preferably, extension pieces 56 are adjustably mounted by guide and screw means generally indicated at 68 to permit raising and lowering of shaft 60 and roller 62 for varying the depth of cut of edges 66 of discs 64.

Rearwardly of bracket means 28 on beams 12 and 14 of frame 10 are provided a pair of guide track assemblies 70 in which are mounted for vertical reciprocation upon adjustment of screw means 72 a pair of depending supports 74 which carry a plow assembly generally designated by the numeral 76. Plow assembly 76 includes a stripping blade 78 which extends laterally of frame 10 and therebelow across the width of traction chain assembly 50 and the width of strips of sod cut by discs 64 of roller 32. Blade 78 is disposed slightly to the rear of roller 32 and has its lowermost cutting edge disposed below the plane of cross members 54 passing under roller 32 a distance equal to the desired thickness of the strip of sod being cut. Plow assembly 76 also includes a carrying plate 80 which extends angularly upwardly and to the rear from stripper blade 78.

Mounted upon chains 52 and spaced therealong predetermined equal distances are pivot pieces 82 between each corresponding pair of which extends a shaft 84 carrying an L-shaped cut-off blade element 86 having a cutting edge 88 and a cam follower leg 90. Extending between brackets 28 are cross pieces 92 and 94 from which depends a cam element 96 having a cam face 98. As will be clear from Figs. 1 and 2 cam follower leg 90 is disposed intermediate the planes of respective chains 52, as is also cam element 96, neither of which need extend clear across the distance between chains 52.

It will be clear that the portion of the structure of the invention thus far described operates in part as follows. As frame 10 is advanced along the ground upon the mobile support provided by traction chain assembly 50 and front wheel assembly 18, edges 66 of discs 64 of roller 62 will make parallel cuts on the ground defining the width of a strip of sod, traction chain assembly 50 will be advanced around roller 32, sprockets 46 and sprockets 38 by virtue of the engagement with the ground of cross bars 54 so that cross bars 54 will ride upon that strip of ground defined by the cuts made by edges 66, cut-off blades 86 as they advance past cam element 96 will be swung to the position shown in Fig. 4 by the action of cam surface 98 upon cam follower leg 90, cutting edge 88 to cut-off blade 86 will be forced into the strip of ground as the blade 86 passes under roller 32 thereby making lateral cuts defining the length of the strip of sod, stripper blade 78 will cut the sod beneath the surface of the ground to define the thickness of the strip, and the strip of sod thus cut will be advanced rearwardly and elevated along plate 80 by the action of bars 54 in engagement with the uppermost surface thereof together with the pushing force of the next following strip of sod.

Extending laterally from beam 14 is a rotatable shaft 100 having a sprocket wheel 102 and a gear 104 rigidly mounted thereon, the latter being within a gear box 106. Sprocket 102 is interconnected with drive sprocket 48 by a chain 108. Gear 104 in turn meshes with a gear 110 within box 106 which is rigidly mounted upon a shaft 112. Shaft 112 extends across frame 10 transversely of the latter and rigidly carries thereon a pair of spaced sprockets 114. A rear frame assembly 116 extends angularly upwardly and rearwardly from the rear end of frame 10 and includes a pair of spacer side members 118 and 120. Rotatably journalled between members 118 and 120 is a shaft 122 carrying a sprocket 124 for each sprocket 114 respectively. Trained around sprockets 114 and 124 is a conveyor chain assembly 126 which may be similar in structure to that described for traction assembly chain 50, although conveyor chain assembly 126 normally need not be possessed of the degree of strength required of assembly 50 and may, therefore, be of generally lighter construction. A resting plate 128 extends laterally of rear frame 116 and underlies an upper stretch 127 of conveyor chain assembly 126 to provide support for the latter. A rotatably supporting roller 130 is also preferably provided beyond the forwardmost end of plate 128 to define a change in slope of the upper stretch of conveyor assembly 126.

As will now be clear, strips of sod advancing upwardly and rearwardly along plate 80 will be picked up on the uppermost stretch of conveyor chain assembly 126 and advanced toward the sod winding apparatus hereinafter to be described. It is also significant that conveyor assembly 126 derives its motive power solely from the interconnection of shaft 112 with shaft 44, the latter being driven by advancement of the traction chain 50 as the machine advances along the ground.

An upstanding bearing block 132 is provided upon each of rear frame members 118 and 120 respectively for supporting a shaft 134 journalled therein. Between blocks 132, shaft 134 carries rigidly mounted thereon a back winder roller 136. One end of shaft 134 extends beyond the block 132 on member 130 and is provided with a rigidly carried sprocket 138, while the opposite end of shaft 134 extending through block 132 on member 120 is provided with a rigidly carried sprocket 140. Shaft 122 also extends at one end thereof beyond rear frame member 120 and rigidly carries a driving sprocket 142. Sprockets 140 and 142 are interconnected by a chain 144 for rotation of back winder roller 136 in a counterclockwise direction as sprocket 142 and shaft 122 rotate in a like direction under the influence of conveyor assembly 126 acting upon sprockets 124.

Swingably mounted on shaft 134 between back winder roller 136 and each of blocks 132 is a link 146 extending upwardly and forwardly from shaft 134. Adajacent the uppermost ends of links 146 is journalled a shaft 148 upon which is rigidly carried a pair of chain supporting sprockets 150. Shaft 148 extends beyond the uppermost link 146 as shown in Fig. 1 and is provided with a rigidly mounted sprocket 152 thereon. Sprocket 138 on shaft 134 and sprocket 152 on shaft 148 are operably interconnected by an endless chain 154. An elongated back winder frame 156 is swingably mounted at its rear end upon shaft 148 and is provided adjacent its front end with a pair of opposed bearing blocks 158 having journalled therein a shaft 160 carrying a pair of spaced chain carrying sprockets 162. Trained around sprockets 150 and 162 is a back winder chain assembly generally designated 164 and having a lower stretch 166, chain assembly 164 being of the same general construction as chain assemblies 126 and 50. A pair of opposed stop elements 168 depend from adjacent the front end of back winder frame 156 and are adapted to abut upon the uppermost face of frame beams 12 and 14 as at 170 to limit downward swinging of the front end of frame 156 to the position illustrated in Fig. 2. An adjustable stop assembly generally designated 172 is also provided on each side of frame 156 adjacent the rear thereof for engaging an upstanding stop member 174 provided on each of members 118 and 120 of rear frame 116, the last mentioned stop serving to limit downward swinging of the forwardmost end of link 146 and shaft 148 to substantially the position illustrated in Fig. 2. A rear stop member 176 extends upwardly from each of rear frame members 118 and 120 and is provided at its uppermost end with adjustable stop means 178 for engaging the upper edge of a corresponding link 146 to prevent upward and rearward swinging of the latter past a predetermined point.

A ramp 180 is rigidly supported between frame beams 12 and 14 by suitable brackets 182. The lowermost and rearmost end of ramp 180 overlies that portion of upper stretch 127 of conveyor assembly 126 disposed over support roller 130 and therefrom extends forwardly and upwardly to a position overlying that portion of traction chain assembly 52 passing over the top of sprockets 46, ramp 180 thus underlying a substantial portion of lower stretch 166 of back winder chain assembly 164 adjacent the forwardmost end thereof. It is significant that the lowermost end of ramp 180 is disposed above that portion of upper conveyor stretch 127 passing over support roller 130 just sufficient to clear a strip of sod being carried along upper conveyor stretch 127 toward back winder roller 136.

When the leading end of a strip of sod being advanced along upper conveyor stretch 127 comes into contact with rotating back winder roller 136, it is picked up and carried upwardly into engagement with the rearmost end of lower stretch 166 of back winder chain 164 and is carried slightly forwardly by the latter. The weight of back winder frame 156, chain 164, sprockets 150 and their associated parts bias the rearmost end of lower chain stretch 166 downwardly under the influence of gravity to force the leading edge of the strip of sod back onto a following portion thereof being advanced by upper stretch 127 of conveyor 126. Such leading edge is then again carried rearwardly by the action of conveyor stretch 127 and the remainder of the strip of sod thereon, the process continuing until a spiral roll of sod has been wound by the combined action of conveyor stretch 127, back winder roller 136 and lower stretch 166 of back winder chain 164.

When a given strip of sod has been completely and compactly formed into a spiral roll, another strip will have in the meantime advanced to a point in contact with back winder roller 136 and will have commenced to form another roll. The first mentioned roll is thereupon being carried by the action of lower stretch 166 of chain 164, which engages the top of such roll, toward ramp 180. It will be noted that as such completed roll is being rolled toward ramp 180 it is moving over the top of a following strip being carried by upper stretch 127 of conveyor 126. Accordingly, when the completed roll reaches the lowermost end of ramp 180 it is moved by lower stretch 166 of chain 164 up the ramp 180, with the forwardmost end of frame 156 and chain stretch 166 swinging upwardly about the pivot of shaft 148 as may be required to permit the passage of such roll along ramp 180. When the completed roll reaches the uppermost and forwardmost end of ramp 180 it is discharged onto the uppermost stretch of traction chain assembly 50, by which it is carried forwardly to a point overlying sprockets 38.

Adjacent the front end of frame 10 is provided an elevating assembly generally designated by the numeral 182 which includes an elevator frame assembly 184 extending upwardly from beams 12 and 14 of frame 10, a pair of vertically spaced horizontal shafts 186 and 188 suitably journalled in frame 184, a number of idler sprockets 190 on shaft 186 and a number of driving sprockets 192 spaced along and rigidly mounted upon shaft 188, and a number of chains 194 trained over corresponding pairs of sprockets 190 and 192.

Shaft 188 extends laterally beyond frame beam 12 and is provided with a sprocket 196 rigidly mounted thereon. Sprocket 196 is operably coupled by an endless chain 198 with sprocket 40 on shaft 36 to provide driving power for shaft 188 and chains 194 derived from the rotation of sprockets 38 by traction chain assembly 52.

A number of forwardly and downwardly extending arms 200 are mounted on frame 10 forwardly of sprockets 38 and are each provided with an upturned forwardmost portion 202, such arms 200 being spaced apart to present slots 204 therebetween. As a completed roll is advanced by traction chain assembly 50 over sprockets 38 the roll is delivered onto the slotted tray presented by arms 200. Chains 194 are provided with a number of curved elevator elements 206 pivotally mounted upon chains 194 as at 208 and adapted to be held in a position disposing their concave surfaces upwardly as they traverse the rearmost stretch of chain 194. Elevator elements 206 are adapted to pass through slots 204 between arms 200 and to thus pick up a roll of sod resting in the tray presented by arms 200—202. As chain 194 advances the roll of sod is lifted in elevator elements 206 and finally discharged over the top of sprockets 190 over a deflector ramp 208 and into an inclined chute assembly 210 mounted on frame structure 184 forwardly of chain 194.

As is best illustrated in Fig. 1, chute 210 is preferably mounted swingably upon a shaft 212 and adapted to be held thereon in position tilted to either side of frame 10 in order that finished rolls of sod may be discharged into a truck or the like on either side of frame 10.

In order to adapt the machine of this invention for convenient transportation between points of use there is provided a pair of depending brackets 214 adjacent the rearmost ends of frame beams 12 and 14 in which are journalled a shaft 216 having pivotally mounted upon each end thereof a crank 218. A relatively large transport wheel 220 is rotatably mounted upon the rearmost and lowermost end of such crank 218 as at 222. The uppermost and forwardmost end of each crank 218 is pivotally connected as at 224 with the reciprocable arm 226 of a hydraulic cylinder or the like 228 which is in turn pivotally interconnected with a corresponding frame beam 12 or 14 as at 229 so that when cylinder 228 is operated to draw arm 226 thereof rearwardly as in Fig. 2, the lower and rearmost portions of cranks 218 will be moved to swing the latter about the pivot provided by shaft 216 and to move wheels 220 into engagement with the ground for raising the rearmost end of frame 10 to clear stripper blade 78, the lowermost portion of traction chain assembly 50 and discs 64 of roller 62 from engagement with the ground. With wheels 220 thus lowered, the machine is entirely supported upon rear wheels 220 and front wheel 26 with all other parts of the machine raised above ground level to facilitate transportation.

It will now be obvious to those skilled in the art that a vastly improved machine of the type described involving many advantageous features over those incorporated in prior machines of the same general class has been provided by this invention. It will also be manifest that certain minor changes and modifications could be made in certain of the structure above described, without materially departing from the true spirit and scope of the invention. Accordingly, it is desired to be limited only by the scope of the appended claims.

Having thus described the invention, what is claimed as new and desired to be secured by Letters Patent is:

1. Sod cutter apparatus comprising a frame; structure rendering the frame mobile for advancement over the ground in one direction, said structure including an endless, ground-engaging traction chain and a rotatable supporting element mounted on the frame and having the chain trained thereunder; means disposed forwardly of the element and below the frame for making a pair of parallel, vertical, strip-width defining cuts in the ground with predetermined spacing therebetween as the frame is advanced in said direction; a stripping blade mounted on the frame transversely of the latter and rearwardly of the element and extending forwardly and downwardly from the frame to a line below the plane of advancement of the ground-engaging portion of the chain and rearwardly of said portion of the chain for making a horizontal, strip-thickness defining cut in the ground at a predetermined depth below the surface of the latter as the frame is advanced in said direction; and a number of cut-off blades mounted at intervals on the chain and extending therefrom for making vertical strip-length defining cuts in the ground with predetermined spacing therebetween as the frame is advanced in said direction and said cut-off blades pass beneath said element.

2. In the apparatus as set forth in claim 1, wherein is provided on the frame a plate having an inclined surface extending angularly upwardly from the stripper blade in a direction opposite said one direction, and said chain is adapted to advance as the frame is advanced and includes a stretch overlying said surface in spaced relationship to the latter and adapted to engage the uppermost face of a strip of sod on the surface for exerting force on the strip to move the same up the surface as the frame is advanced in said one direction.

3. In the apparatus as set forth in claim 2, wherein is provided on the frame rolling means operably coupled with the chain for operation as the latter is advanced for rolling a strip of sod into a spiral roll after the strip is elevated by the surface and as the frame is advanced in said one direction.

4. In the apparatus as set forth in claim 3, wherein is provided on the frame an endless back-winder chain operably coupled with the traction chain for advancement as the latter is advanced and having a lowermost stretch disposed for engagement with the uppermost extremity of a roll of sod formed by said rolling means for moving the roll away from said rolling means as the frame is advanced in said one direction.

5. In the apparatus as set forth in claim 4, wherein is provided on the frame an inclined ramp disposed below a portion of said back-winder chain and extending angularly upwardly in a direction away from said rolling means, said back-winder chain being mounted for swinging movement toward and away from the ramp for passage of a roll of sod therebetween for further elevating said roll by movement thereof up said ramp as the frame is advanced in said one direction.

6. In the apparatus as set forth in claim 5, wherein said traction chain is provided with an upper stretch disposed to receive a roll of sod after it has been advanced beyond the uppermost extremity of the ramp by the back-winder chain and to further advance and deliver said roll to a zone of access.

7. In the apparatus as set forth in claim 6, wherein is provided on the frame an inclined, gravity delivery chute disposed above the level of said zone of access, and chain elevator means on the frame operably coupled with the traction chain for operation as the latter is advanced and disposed for receiving a roll of sod from said upper stretch of the traction chain, elevating said roll and discharging the latter into the chute as the frame is advanced in said one direction.

8. Sod cutter apparatus comprising a frame; structure rendering the frame mobile for advancement over the ground in one direction, said structure including an endless, ground engaging traction chain and a rotatable supporting element mounted on the frame and having the chain trained thereunder; means disposed forwardly of the element and below the frame for making a pair of parallel, vertical, strip-width defining cuts in the ground with predetermined spacing therebetween as the frame is advanced in said direction; a stripping blade mounted on the frame transversely of the latter and rearwardly of the element and extending forwardly and downwardly from the frame to a line below the plane of advancement of the ground engaging portion of the chain and rearwardly of said portion of the chain for making a horizontal, strip-thickness defining cut in the ground at a predetermined depth below the surface of the latter as the frame is advanced in said direction; a number of cut-off blades mounted at intervals on the chain and extending therefrom for making vertical, strip-length defining cuts in the ground with predetermined spacing therebetween as the frame is advanced in said direction; and means for elevating a strip of sod after it has been cut and as the frame is advanced in said one direction.

9. In the apparatus as set forth in claim 8 wherein is provided means for receiving a strip of sod after it has been cut and elevated and for rolling the strip into a spiral roll as the frame is advanced in said one direction.

10. In the apparatus as set forth in claim 9 wherein is provided means for moving a strip of sod away from said rolling means after said strip has been cut, elevated and rolled.

11. In the apparatus as set forth in claim 10 wherein is provided means for further elevating and discharging a strip of sod after it has been cut, elevated, rolled and moved away from said rolling means.

References Cited in the file of this patent

UNITED STATES PATENTS

| | | |
|---|---|---|
| 41,371 | Foley | Jan. 26, 1864 |
| 1,732,972 | Knipfing | Oct. 22, 1929 |
| 1,909,752 | Calkins | May 16, 1933 |
| 2,058,243 | Lipincott | Oct. 20, 1936 |
| 2,401,653 | Mohler | June 4, 1946 |
| 2,573,188 | Dyken | Oct. 30, 1951 |
| 2,614,477 | Habenicht | Oct. 21, 1952 |
| 2,617,347 | Provost | Nov. 11, 1952 |
| 2,663,242 | Lancaster | Dec. 22, 1953 |